United States Patent
Igarashi et al.

(10) Patent No.: US 10,982,530 B2
(45) Date of Patent: Apr. 20, 2021

(54) APPARATUS, SYSTEM AND METHOD OF A MAGNETICALLY SHIELDED WELLBORE GYROSCOPE

(71) Applicant: Schlumberger Technology Corporation, Sugar Land, TX (US)

(72) Inventors: Juei Igarashi, Yokohama (JP); Sogo Kuroiwa, Kawasaki (JP); Shigeru Sato, Inagi (JP); Akira Kamiya, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 107 days.

(21) Appl. No.: 15/089,586

(22) Filed: Apr. 3, 2016

(65) Prior Publication Data
US 2017/0284188 A1   Oct. 5, 2017

(51) Int. Cl.
*E21B 47/024* (2006.01)
*G01C 19/5684* (2012.01)
*E21B 7/04* (2006.01)
*E21B 47/092* (2012.01)
*E21B 47/12* (2012.01)

(52) U.S. Cl.
CPC ............... *E21B 47/024* (2013.01); *E21B 7/04* (2013.01); *E21B 47/092* (2020.05); *G01C 19/5684* (2013.01); *E21B 47/12* (2013.01)

(58) Field of Classification Search
None
See application file for complete search history.

(56) References Cited

U.S. PATENT DOCUMENTS

| | | | | |
|---|---|---|---|---|
| 3,778,700 A * | 12/1973 | Bayley | ............... | G01R 33/0322 324/304 |
| 4,109,391 A * | 8/1978 | Wing | ..................... | G01C 19/38 33/275 G |
| 4,509,014 A * | 4/1985 | Karwacki | ............. | G01C 19/62 324/304 |
| 4,563,695 A * | 1/1986 | Tarutani | ................ | H01L 39/223 257/36 |
| 4,651,565 A * | 3/1987 | Keene | ..................... | G01C 19/58 324/160 |
| 5,535,077 A * | 7/1996 | Saito | ..................... | G11B 5/3929 360/315 |
| 5,698,784 A * | 12/1997 | Hotelling | ........... | G01C 19/5607 73/504.16 |
| 6,798,625 B1 * | 9/2004 | Ueno | ..................... | B82Y 10/00 360/324.1 |
| 7,801,704 B2 | 9/2010 | Sato et al. | | |
| 7,872,473 B2 * | 1/2011 | Kitching | ................ | G01R 33/26 324/300 |
| 8,061,048 B2 | 11/2011 | Imamura et al. | | |
| 8,278,923 B2 * | 10/2012 | Samson | ................ | E21B 47/024 324/300 |

(Continued)

*Primary Examiner* — Jill E Culler

(57) ABSTRACT

A gyroscope package, system and method for use in a downhole tool suitable are provided. The gyroscope package, system and method includes a housing coupleable with a downhole tool, a gyroscope body within the housing, and an inductive-type MEMS gyroscope. The MEMS gyroscope includes a magnetic shield disposed around the inductive-type MEMS gyroscope to magnetically shield the inductive-type MEMS gyroscope.

20 Claims, 8 Drawing Sheets

(56) References Cited

U.S. PATENT DOCUMENTS

| | | | |
|---|---|---|---|
| 8,581,580 B2* | 11/2013 | Maida, Jr. | E21B 47/024 |
| | | | 324/300 |
| 2002/0174720 A1 | 11/2002 | Cardarelli | |
| 2004/0200637 A1* | 10/2004 | Yumura | H01B 12/06 |
| | | | 174/125.1 |
| 2007/0209437 A1* | 9/2007 | Xue | B81B 3/0032 |
| | | | 73/514.31 |
| 2010/0223796 A1 | 9/2010 | Imamura et al. | |
| 2010/0326264 A1* | 12/2010 | Roemerman | B64D 1/06 |
| | | | 89/1.56 |
| 2011/0197460 A1 | 8/2011 | Magosaki | |
| 2013/0104653 A1 | 5/2013 | Bernstein et al. | |
| 2015/0083410 A1* | 3/2015 | Steele | E21B 47/024 |
| | | | 166/255.3 |
| 2016/0154020 A1* | 6/2016 | Zhang | B81B 5/00 |
| | | | 73/504.12 |
| 2016/0202083 A1* | 7/2016 | Bulatowicz | G01C 19/62 |
| | | | 324/304 |

* cited by examiner

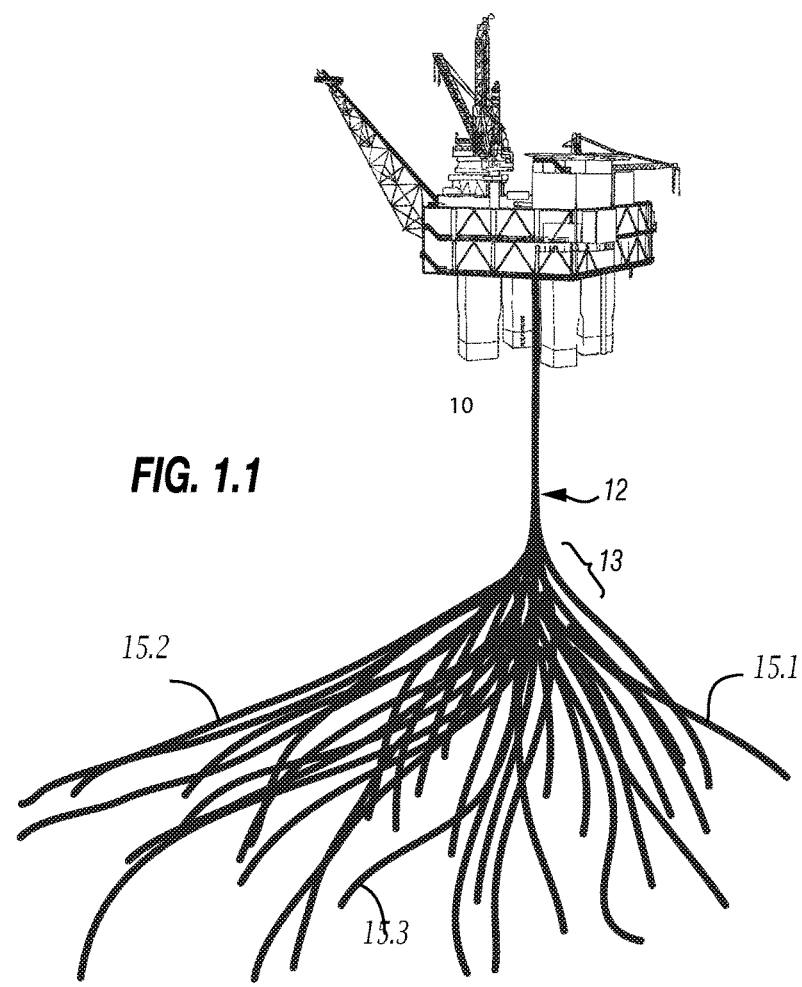
FIG. 1.1
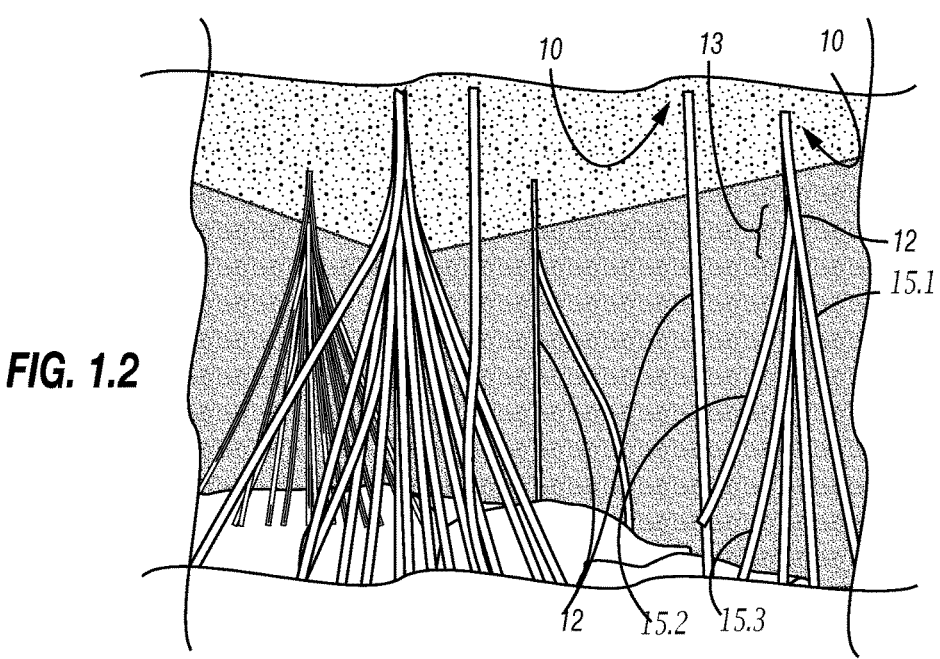
FIG. 1.2

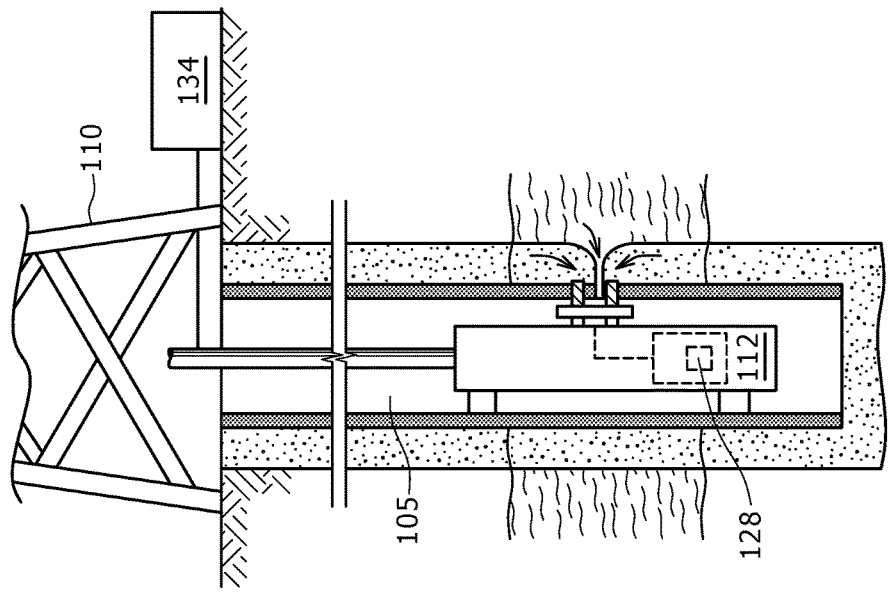
FIG. 1.3
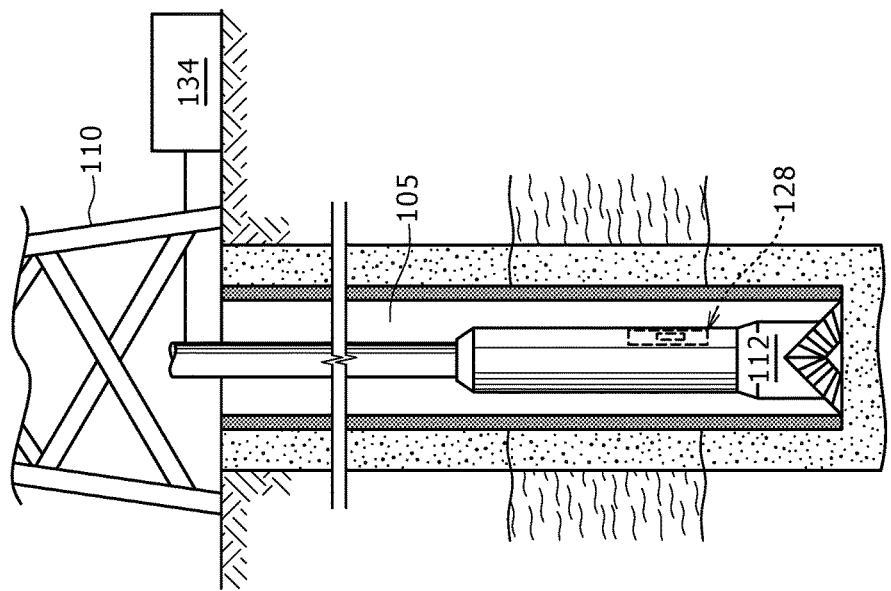
FIG. 1.4

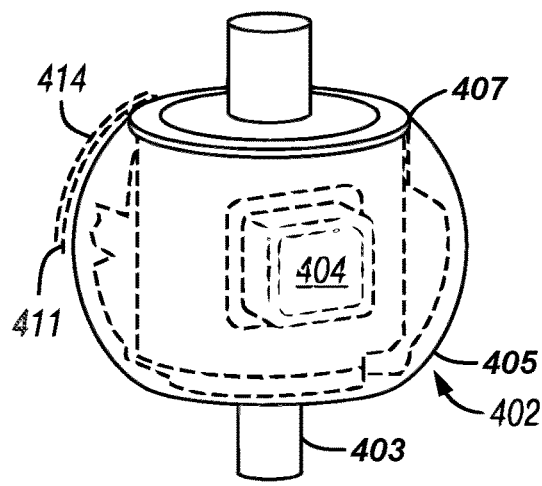
FIG. 4.1
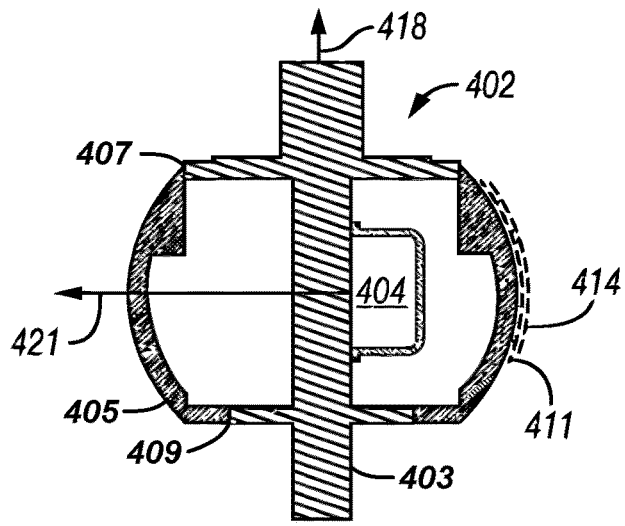
FIG. 4.2
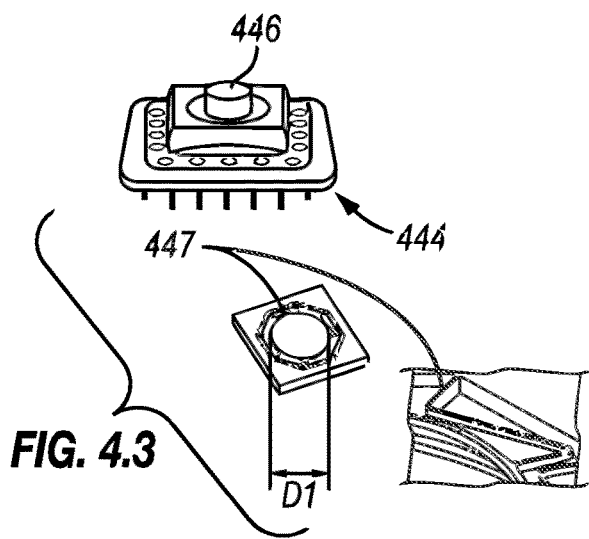
FIG. 4.3
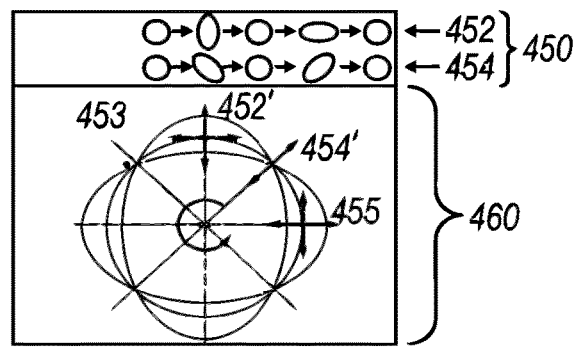
FIG. 4.4

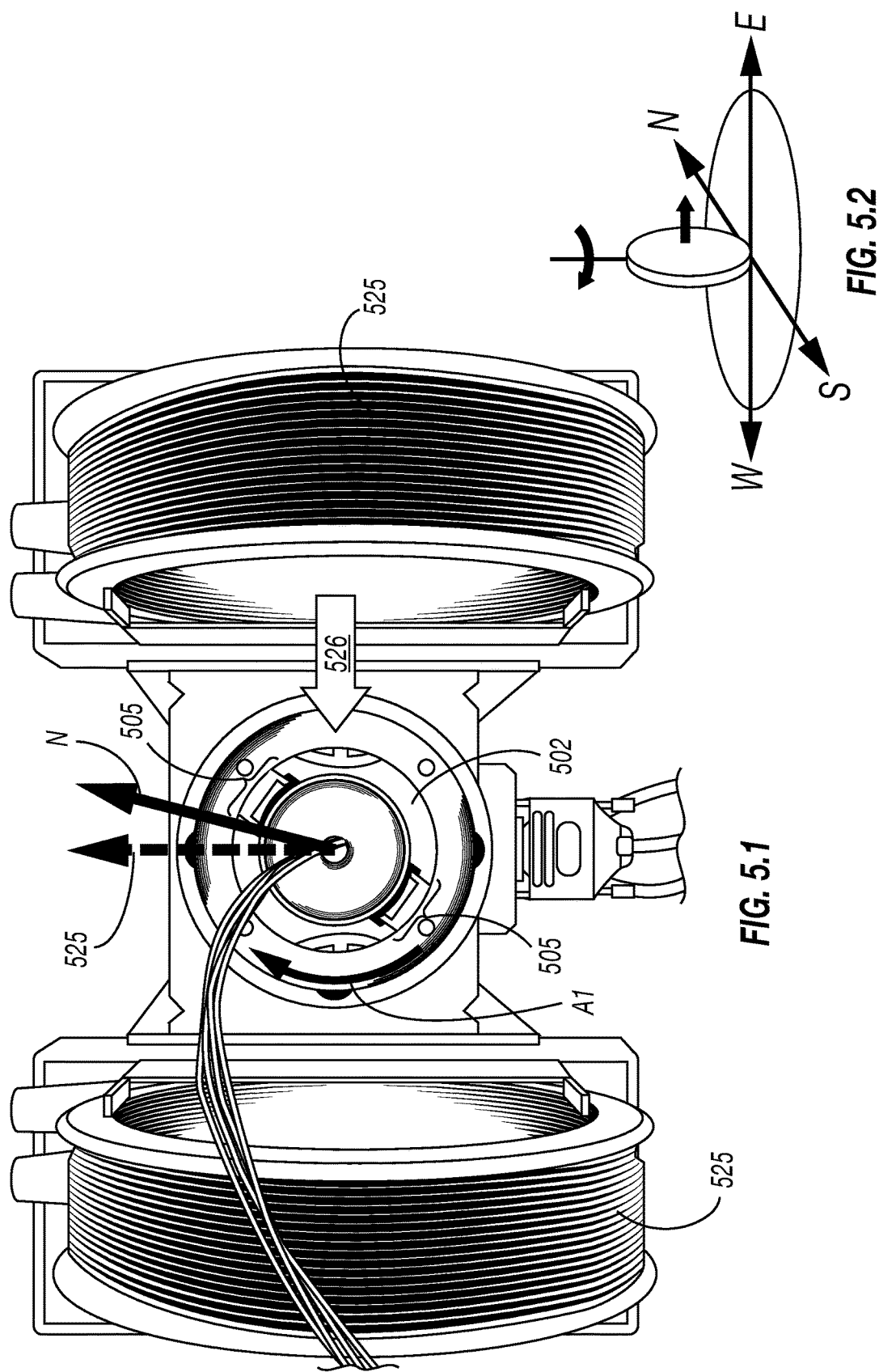

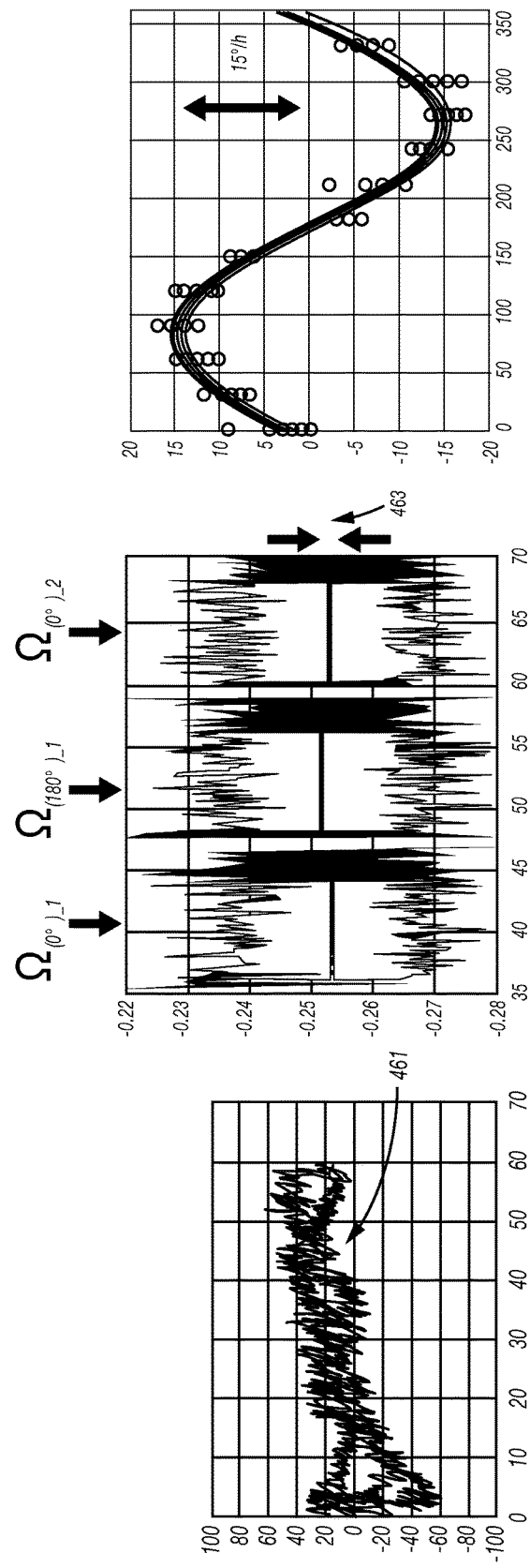
FIG. 6.3
FIG. 6.2
FIG. 6.1

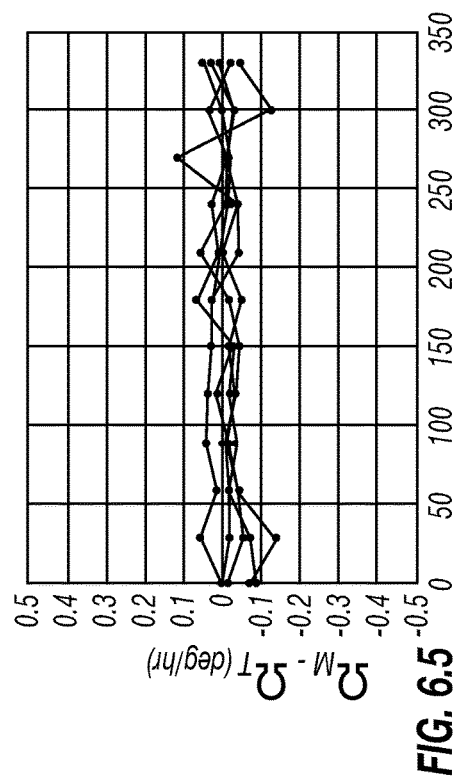
FIG. 6.4
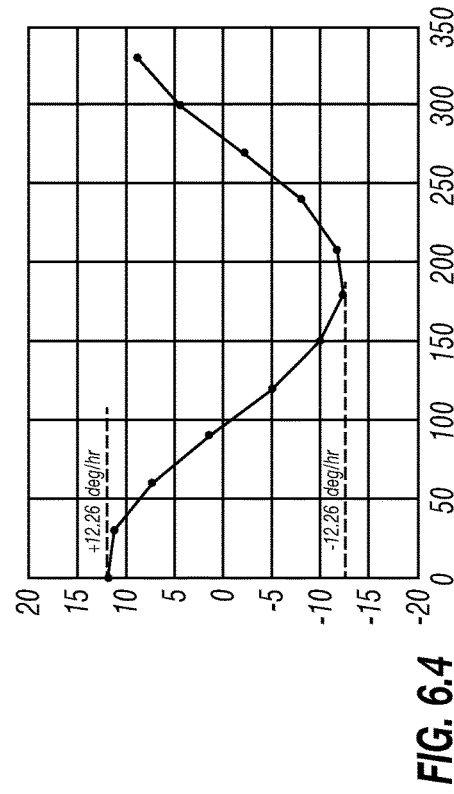
FIG. 6.6
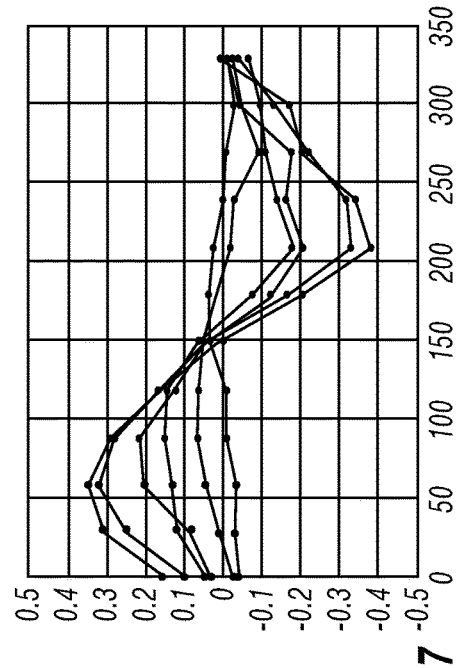
FIG. 6.5
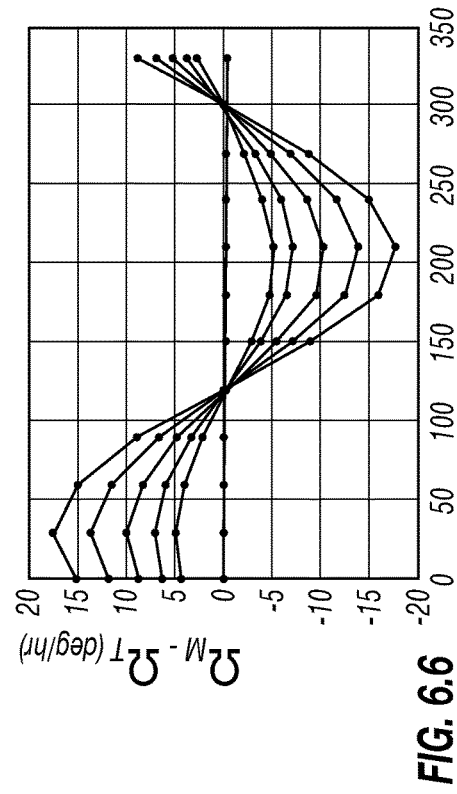
FIG. 6.7

APPARATUS, SYSTEM AND METHOD OF A MAGNETICALLY SHIELDED WELLBORE GYROSCOPE

BACKGROUND

The present disclosure relates to wellbore navigational devices and techniques. More specifically, the disclosure relates to inductive-type gyroscope sensors for wellbore measuring and navigating in oilfield exploration activities. In some embodiments, the inductive-type gyroscope sensors are Micro Electro-Mechanical System (MEMS) gyroscopes. The disclosure uses MEMS gyroscopes as an example, but aspects of this disclosure are not limited to only MEMS gyroscopes.

Modern technology has enabled the performance of drilling and logging operations within wellbores that extend sophisticatedly under the surface in winding, curving and horizontal underground fashions. These environments are harsh and equipment-unfriendly, and may demand equipment-aided monitoring of orientation (e.g., inclination) and other parameters of or within the wellbore. For example, a downhole tool in such venues may indicate almost constant monitoring of the position and direction of the downhole tool, such as during drilling, for enabling accomplishment of planned objectives.

Gyroscopes may be used in the context of such drilling and monitoring activities. Currently there are several types of gyroscope sensors used in navigation fields. Mechanical and optical-based gyroscopes have been developed. Micro Electro Mechanical Systems (MEMS) gyroscopes are miniaturized gyroscopes, being fabricated via employment of micromachining technology.

As suggested by the name, MEMS are packaged similarly to other integrated circuits and may provide either analog or digital outputs. A single part may include gyroscopic sensors for multiple axes, and a microprocessor. Internally, a MEMS gyroscope may use lithographically constructed versions of tuning forks, vibrating wheels, or resonant solids of various designs. Owing to their utilization of silicon semiconductor device fabrication technology, much of the sensing elements of MEMS gyroscopes may embody crystal silicon.

MEMS gyroscopes have an expansive range of applications, encompassing uses such as in compasses, spacecraft, automobiles and motorcycles, dedicated computer systems, and consumer electronics, such as pointing devices, gaming devices and smart phones, powered underwater devices, industrial robotics, and subterranean wellbore sensors. Published documents reflecting structures and related techniques are provided in US20130104653, entitled "MEMS Hemispherical Resonator Gyroscope," U.S. Pat. No. 8,061, 048, entitled "Apparatus for Azimuth Measurements Using Gyro Sensors," US20110197460, entitled "Six-Direction Indicator," US20100223796, entitled "Apparatus for Azimuth Measurements Using Gyro Sensors," U.S. Pat No. 7,801,704, entitled "Method and System for Azimuth Measurements Using Gyro Sensors," and US20020174720, entitled "MEMS Gyroscope and Accelerometer with Mechanical Reference." Inductive-type MEMS gyroscopes are sometimes referred to as a third generation of the gyroscope technology.

SUMMARY

In at least one aspect, the disclosure relates to a magnetically shielded inductive-type MEMS gyroscope package for use in a downhole tool suitable for operation within a wellbore penetrating a subterranean formation. The package may include a housing coupleable with the downhole tool and a gyroscope body rotatably provided within the housing. In addition, the package may further include an inductive-type MEMS gyroscope disposed within the gyroscope body and a magnetic shield disposed around the inductive-type MEMS gyroscope to magnetically shield the inductive-type MEMS gyroscope.

A magnetic shield can be disposed about the inductive-type MEMS gyroscope to magnetically shield the inductive-type MEMS gyroscope. The magnetic material may be provided over one or more of a housing interior surface, a housing exterior surface, a body interior surface, or a body exterior surface. For protection of the magnetic material, a protective material may be provided. The protective material may protect at least a part of the magnetic shield.

In another aspect, the disclosure relates to a system for providing angular measurement in subterranean oil well drilling and logging environments. The system may include a downhole tool positionable within a wellbore penetrating a subterranean formation, the downhole tool comprising a housing and a gyroscope body rotatably provided within the housing. In addition, the system may include an inductive-type MEMS gyroscope disposed within the gyroscope body and a magnetic shield disposed about the inductive-type MEMS gyroscope to magnetically shield the inductive-type MEMS gyroscope.

In still another aspect, the disclosure relates to a method of monitoring angular measurement of a downhole tool. The method includes disposing an inductive-type MEMS gyroscope within a gyroscope body, the gyroscope body having a body inner surface and a body outer surface and providing a downhole tool, the downhole tool having a housing with a housing outer surface and a housing inner surface, and being constructed to hold the gyroscope body therein. In addition, the method may include positioning a magnetic shield on or within one or more of the body inner surface, the body outer surface, the housing inner surface, the housing outer surface, or a casing of the inductive-type MEMS gyroscope and activating a motor within the housing both to rotate the gyroscope body about a body axis and to change an orientation of the body axis.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for accomplishing a wellbore inductive-type MEMS gyroscope with magnetic shielding and a protective, compact architecture are described with reference to the following figures. Like numbers are used throughout the figures to reference like features and components.

FIGS. 1.1 to 1.4 are environment views illustrating wellbore implementations featuring drilling or logging while drilling (LWD), wireline and/or coiled tubing applications, operating in conjunction with the inductive-type MEMS gyroscopes installed therein in accordance with an embodiment of the disclosure;

FIGS. 4.1 to 4.3 are perspective, cross-sectional, and sundry views, respectively, of a gyroscope body and its inductive-type MEMS gyroscope in accordance with an embodiment of the disclosure;

FIG. 4.4 depicts is a schematic diagram illustrating various characteristics of the MEMS gyroscope of FIG. 4.3 in accordance with an embodiment of the disclosure;

FIGS. 5.1 and 5.2 are physical and schematic views illustrating experimental protocols, physically and conceptually, for collecting data using the MEMS gyroscope in accordance with an embodiment of the disclosure;

FIGS. 6.1-6.7 are plots illustrating experimental data collected corresponding to the criteria of FIGS. 5A and 5B in accordance with an embodiment of the disclosure.

DETAILED DESCRIPTION

Figure 2:
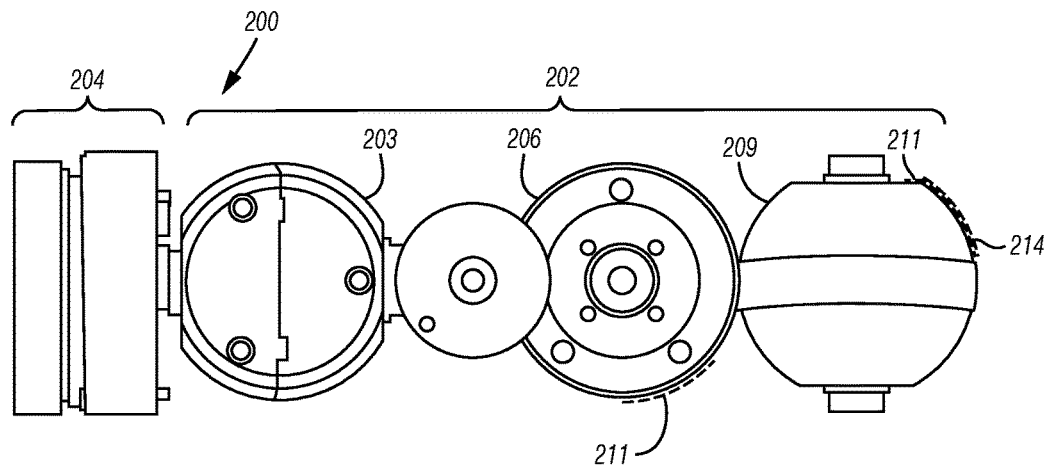
FIG. 2 is a plan view illustrating a three-body inductive-type MEMS gyroscope package in accordance with an embodiment of the disclosure.

In the following description, numerous details are set forth to provide an understanding of the present disclosure. However, it will be understood by those skilled in the art that the present disclosure may be practiced without these details and that numerous variations or modifications from the described embodiments are possible.

The present disclosure relates to downhole sensing and sensors. In particular, the disclosure relates to MEMS gyroscopes used, for example, to provide position information concerning downhole tools (e.g., logging, drilling tools) deployed into wellbores. The MEMS gyroscope is an inductive type sensor that may be used in downhole applications involving small size, low cost, manufacturability, temperature reliability, measurement accuracy, efficiency, and safety needs. Measurement accuracy may be dependent on a magnetic sensitivity of the measurement behavior of inductive-type MEMS gyroscopes, and oilfield applications may be used in environments having magnetic interference. The MEMS gyroscope may be provided with a sensor casing, gyroscope body, or housing, which is covered with magnetically highly permeable material (e.g., permalloy, supermalloy, Permendur or µ-metal, etc.) to provide magnetic shielding of the MEMS gyroscope.

FIGS. 1.1 to 1.4 are environment views of wellbore implementations featuring drilling or logging while drilling (LWD), wireline and/or coiled tubing applications, operating in conjunction with the inductive-type MEMS gyroscopes installed therein.

The first two renditions, FIGS. 1.1 and 1.2, show wellbores extending convolutedly under the surface in winding, curving and horizontal or near horizontal underground fashions. Upper parts of the wellbores 12 may branch at junctures 13 into offshoot wellbores or tributaries 15.1, 15.2, 15.3 that tend to wind and curve with depth. Gyroscopic measurement is used for effective/efficient drilling operations as well as collision-avoidance, for example for multilateral wells from the offshore platform(s) 10 as shown. Magnetic interference, however, due to the presence for example of steel casing, can cause a given magnetometer to malfunction, hence indicating gyroscopic directional drilling as a way to identify well trajectory under the magnetized circumference.

In contrast to the offshore platform 10 of FIG. 1.1 and/or FIG. 1.2, the following FIGS. 1.3 and 1.4 elucidate wellbores 105 in service in conjunction with land-based oil derricks and rigs 110. The sundry wellsite schematics of contemplated applicability, amongst others, of the inductive-type MEMS gyroscopes, e.g., contained within packages 128, as operated beneath such equipment share a common need for reliable navigability, to be provided from reliable downhole navigational equipment. In each depiction, inductive-type MEMS gyroscopes, cf. 128, are implemented to provide such reliability, each being provided within a downhole tool 112 within a wellbore 105 for facilitating, for instance, wellbore or downhole surveying. In the domain of logging while drilling (LWD), inductive-type MEMS gyroscopes, cf. 128, can operate to acquire navigational (e.g., yaw) data for geosteering, e.g. the downhole tool 112. The inductive-type MEMS gyroscopes, cf. 128, have applicability to wireline aspects of logging that employ electrical cable to lower the downhole tool 112 into the wellbore 105 to collect and transmit information via the inductive-type MEMS gyroscopes and signal measurers.

A signal measurer can take the form of a surface telemetry module 134 and a downhole telemetry module, cf. 128, in communication with the surface telemetry module. In addition to the mentioned LWD and wireline interventions, other applications contemplated to benefit from the inductive-type MEMS gyroscopes may include endeavors entailing coiled-tubing string and associated equipment. Coiled-tubing techniques may employ, for example, inductive-type MEMS gyroscopes under live well conditions with a continuous string, enabling fluids to be pumped without regard to the position or direction of travel. As articulated herein, the methods and architectural arrangements of inductive-type MEMS gyroscopes for use in applications including the above may be directed at improving signal quality by attenuating, in particular, unwanted magnetic wave noise.

Disclosed herein are inductive-type MEMS gyroscopes in forms such as mechanically vibrating gyroscopes and rotating ring gyroscopes, for providing enhanced wellbore monitoring. For this monitoring, yaw with respect to an axis of the downhole tool can impart pertinent information. Yaw, for instance, can be measured by utilizing inductive-type MEMS gyroscopes configured as set forth below.

FIG. 2 depicts an assembly of an arrangement of an inductive-type MEMS gyroscope package 200. Here, the inductive-type MEMS gyroscope package 200 is employed as a three-body inductive-type MEMS gyroscope package, such as that of a TSC-Gyro 3-axis module. The inductive-type MEMS gyroscope package 200 may comprise a motor 204 and a series 202 of inductive-type MEMS gyroscope bodies. The inductive-type MEMS gyroscope package 200, can comprise an X-Y gyroscope body 203 housing a first inductive-type MEMS gyroscope (not shown), a Y-Z gyroscope body 206 housing a second inductive-type MEMS gyroscope (not shown), and a Z-X gyroscope body 209 housing a third inductive-type MEMS gyroscope (not shown). Structural and operational details on the operation of such a package can be found in the above-referenced U.S. Pat. No. 8,061,048, the entire contents of which is hereby incorporated by reference herein. Each of the gyroscope bodies 203, 206 and 209 has a rotation axis (i.e., body axis). Further, the rotation axis of the gyroscope body holding each inductive-type MEMS gyroscope is orthogonal to the rotation axes of the other gyroscope bodies.

In the combination, the input axes of the first, second and third inductive-type MEMS gyroscopes within the gyroscope bodies 203, 206 and 209 are about orthogonal to one another. Each of the inductive-type MEMS gyroscopes is driven about its input axis about perpendicular to the rotation axis of its respective gyroscope body. For instance, the first inductive-type MEMS gyroscope can be driven about its input axis perpendicular to the rotation axis of its X-Y gyroscope body 209. The motor 204 supplies mechanical power for rotating the gyroscope bodies 203, 206 and 209, whereas the first, second and third inductive-type MEMS gyroscopes are driven via currents which generate magnetic fields influencing the vibrations, e.g., vibrating rings, thereof. That is, the inductive-type MEMS gyroscopes of this disclosure are driven rather than "rotated" about their input axes, meaning they are vibrationally operated according, for instance, to vibrating structure gyroscope (VSG) and Coriolis Vibratory Gyroscope (CVG) principles known to those skilled in the technology.

According to a feature, a magnetic shield 211, of relatively high-magnetic permeability as compared to, for example, a permeability of steel is disposed around about all regions of each inductive-type MEMS gyroscope to magnetically shield all of the regions of the inductive-type MEMS gyroscope about equally. The magnetic shield can be characterized by a relative permeability of at least about 100, and, in other implementations, of at least about 10,000, or at least about 100,000.

As will be elucidated below, a performance criteria in some cases may indicate encompassing, about entirely, each inductive-type MEMS gyroscope, thereby to magnetically shield, about completely, each inductive-type MEMS gyroscope. To this end, the magnetic shield 211 can be formed as a layer (e.g., a film) over one or more of an interior surface and an exterior surface of the housing, and/or can be integrally formed with the housing. The magnetic shield 211 can be formed, for instance, as a layer (e.g., a film) over interior and/or exterior surfaces of one or more of the gyroscope bodies 203, 206 and 209. Moreover, in embodiments comprising a small casing (e.g., plate) around or holding each inductive-type MEMS gyroscope, the magnetic shield 211 may be formed as a layer (e.g., a film) over interior and/or exterior surfaces of one or more of the casings. Furthermore, the magnetic shield 211 may be integrally formed with one or more of the gyroscope body and the casing. Thicknesses of the layers of magnetic shield 211, and concentrations/densities of the magnetic shield 211 material when formed integrally with the housing, gyroscope body and/or casing, may comprise, for example, from the order of hundreds of micrometers to tens of millimeters, and/or may be adjusted according to the material and characteristics of the particular magnetic shield(s) 211 and intended applications.

Another feature is based on the unique uses and applications of the present combinations, namely, downhole activities such as surveying and/or geosteering, which may present environments that are harsh and equipment-unfriendly. Additionally, a hardness of the magnetic shield 211 may be exposed to moving parts and subject to wear in such environments and/or for applications. The hardness of the magnetic shield 211, which according to this description may comprise, for example, one or more of permalloy, supermalloy, PC-permalloy, permendur, and µ-metal, may be less than a hardness of, for example, steel. For protection, a protective material 214 is provided, which may operate, for instance, as a mechanically-protective layer disposed over the magnetic shield. A composition or characteristic of the protective material 214 may be selected, for example, to exhibit a hardness greater than a hardness of steel. Examples of protective materials contemplated herein include, without limitation, one or more of SUS304, SUS630, Titanium alloy, Inconel alloy, Aluminum alloy and Diamond-Like Carbon.

On the topic of PC-permalloy, for example, it contains approximately 78-80% of nickel. A specific annealing process is performed with the permalloy parts after machining to obtain the appropriate magnetic properties for application with this description.

The protective material 214 is layered over one or more of the above magnetic shields 211 and/or is integrally formed into, and/or layered onto, any of the housing, gyroscope bodies, and casings, which are formed with or to comprise magnetic shield 211. Thicknesses of the layers of protective material 214, and concentrations/densities of the protective material 214 when formed integrally with the housing, gyroscope body and/or casing, may comprise, for example, from the order of millimeters to the order of ten millimeters, or in the order of micrometers in case of coatings, and/or may be adjusted according to the material and characteristics of the particular protective material(s) 214, magnetic shield(s) 211 and/or intended applications.

Figure 3:
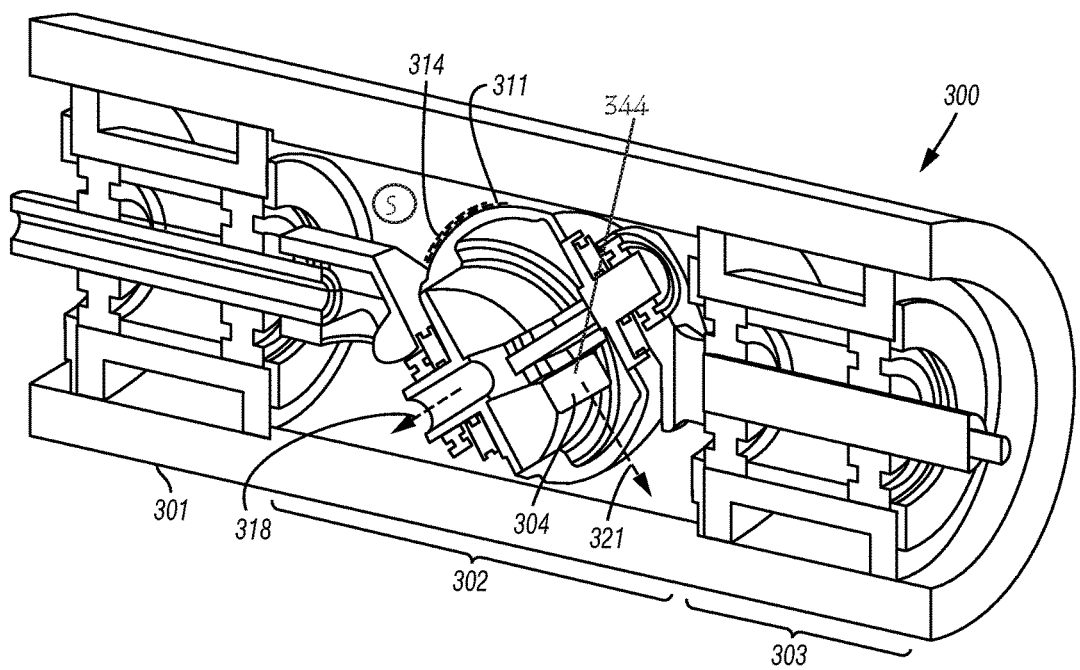
FIG. 3. is a cross-sectional view illustrating a compact single-body inductive-type MEMS gyroscope package in accordance with an embodiment of the disclosure.

Turning to FIG. 3, a compact implementation of the assembly set forth in the preceding figure is depicted in the form of a single-body inductive-type MEMS gyroscope package 300 including, and positioned within, a housing 301. As compared to the above embodiment, rather than a three-body configuration, the compact implementation of FIG. 3 utilizes just a single gyroscope body to accomplish, e.g., inter alia, the functionality of the three-body assembly. The design/implementation of this single gyroscope body can yield results including a benefit of compactness, which may be particularly advantageous in the downhole environment.

Considering more closely the FIG. 3 embodiment, the inductive-type MEMS gyroscope package 300 can be fashioned to comprise a motor 303 and a single gyroscope body, embodied herein in the form as shown of gyroscope body 302. Structural and operational details on the operation of a gyroscope package can be found in the above-referenced US20110197460, the entire contents of which are hereby incorporated by reference herein. The gyroscope body 302 can comprise a single inductive-type MEMS gyroscope 344 secured within the gyroscope body 302 via, for instance, an optional casing 304 which as suggested above may be an enclosure or plate.

According to an aspect, a rotation axis (i.e., body axis) 318 of the gyroscope body 302 is orthogonal to an input axes 321 of the inductive-type MEMS gyroscope 344 held therein. Also, the gyroscope body 302 has, at opposing ends thereof, a first rotational axis which is powered by the motor 303 and a second rotational axis which is parallel to the first rotational axis but not powered, whereby the body axis 318 extends through the first rotational axis and the second rotational axis. The housing 301 comprises a non-powered axis collinear to, but not connected to, a rotating member of the motor 303, the motor 303 being disposed adjacent to the gyroscope body 302 in a vicinity of the gyroscope body 302 which is opposite to a region of the gyroscope body adjacent to the non-powered axis.

As a consequence of the preceding, the first rotational axis can be powered to enable rotation of the gyroscope body 302 via coupling to the rotating member of the motor 303, the rotating member of the motor in other words being coupleable to rotationally drive the first rotational axis thereby to rotate the gyroscope body.

Moreover, the rotation axis 318 of the gyroscopic body 302 can be movable, e.g., in x, y and/or z directions, to accomplish features and/or functions such as provided by the above publication(s), in any whole or piece-meal combination to the extent not mutually exclusive, and/or by the three-body assembly of FIG. 2. For instance, the gyroscope body 302 can be rotated and flipped, and provided with North Finder functionality. That is, the gyroscope body 302 can be positioned/rotated in such ways as to change the input-axis 318 position inside a downhole tool 112 for obtaining measurements, an example being to flip the inductive-type MEMS gyroscope 344 for a bias-offset cancellation during compassing measurement based on Earth-rate vector detection.

Advantages of this construction and use can be determination of the Earth-rate vector via a single gyroscope sensor (without scale factor (SF) miss-matching) and/or direct drive (without gear backlash).

Other sensors S, such as an accelerometer (e.g., a miniature accelerometer) and/or a microcontroller (e.g., a microprocessor, or an application specific integrated circuit (ASIC)) can also be provided, for example, within the gyroscope body 302, such as in silicon/semiconductor form within or as a part of the chip layout of the inductive-type MEMS gyroscope 344.

According to an aspect, the rotation axis 318 of the gyroscope body 302 is fixed in addition to being positioned to be about orthogonal to the input axes 321 of the inductive-type MEMS gyroscope 344. For instance, as shown, the inductive-type MEMS gyroscope 344 (housed within casing 304) can be driven with its input axis 321 normal to the rotation axis 318 of the gyroscope body 302. Meanwhile, the motor 303 and/or an additional motor (not shown) can supply power to mechanically rotate the gyroscope body 303 and also to change the orientation of the rotation axis 318 so as to accomplish the features and/or functions mentioned in the preceding paragraph, such as accurate angular, e.g., yaw, measurement.

For added operational advantage, e.g. accuracy, a magnetic shield 311, of high-magnetic permeability as compared to steel, is disposed around all or about all regions of the inductive-type MEMS gyroscope 444 to magnetically shield all of the regions of the inductive-type MEMS gyroscope 444, e.g., equally or about equally. Details of such disposal, in any combination or permutation, as described above, are applicable to the context of the present single-body inductive-type MEMS gyroscope package 300 embodiment. The magnetic shield 311 can be characterized by any relative permeability, construction, composition, and/or positioning as described above.

A protective material 314 is provided in contact with the magnetic shield 311, the provision, positioning, shape, orientation, material, and/or other attributes thereof being selected, for example, to exhibit any, some or all of the above-noted properties and applications in the context of application to structure(s) of the single-body inductive-type MEMS gyroscope package 300.

The inductive-type MEMS gyroscope packages 200 and 300 are suited and configured for operation within or in connection with a downhole tool 112, and accordingly can be coupled with one or more downhole telemetry modules, such as may be positioned within packages 128 (FIGS. 1.3 and 1.4), of a signal measurer whereby communication of information may be exchanged with surface electronics. The information may be in the context of measurement and monitoring of navigationally-relevant data and/or any of the above mentioned features and/or functions, performed in association with one or more inductive-type MEMS gyroscope packages, from within the wellbore 105. The inductive-type MEMS gyroscope package of FIG. 2 can include a housing (not shown), which surrounds and protects the components of the combination and which may comprise part of or be coupled to a downhole tool 112 (FIGS. 1.3 and 1.4). In FIG. 2, the number of gyroscope bodies can exceed three, or can be fewer than three such as that described in FIG. 3. Furthermore, although the gyroscope bodies in FIG. 2 are shown aligned with and driven by a single motor 204, the assembly need not be limited to this exact physical inter-arrangement and inter-attachment or association.

FIGS. 4.1 and 4.2 show perspective and cross-sectional views of a gyroscope body 402 that includes an axle 403 and a hollow body 405 where the axle 403 passes through hollow body axle openings 407 and 409 of the hollow body 403, which may correspond to the structure discussed above with reference to either of FIGS. 2 and 3. Shown in the figures are above-discussed items such as a casing (e.g., plate) 404 of an inductive-type MEMS gyroscope, a magnetic shield 411, a protective material 414, an input axis 412 of the inductive-type MEMS gyroscope, and a rotation axis 418 of the axle 403.

FIG. 4.3 shows an inductive-type MEMS gyroscope 444 used with this description. The inductive-type MEMS gyroscope 444 may comprise a magnet 446 and a sensing element, e.g., vibrating ring, in the form of a ring resonator 447 having a ring gauge of about 100 um and a diameter D1 of about 6 mm, and configured to vibrate at 14 kHz with no vibration modes existing at frequencies below about 5 kHz. The lower right hand image is a magnified view of the ring resonator 447. An inductive-type MEMS gyroscope 444 may correspond to that specified by BAE Systems, AIAA40, 2001. The sensing element 447 may be obtained as a CRS09 from Silicon Sensing Systems, of Japan (http://www.sssj.co.jp/en/). The inductive-type MEMS gyroscope may be used in compact and harsh oilfield applications (i.e., operation environments) to provide a smaller in size than other types of gyroscopes, and to provide high temperature capability because of its high-temperature fabrication process (>300° C.).

FIG. 4.4 depicts various characteristics of the components of FIG. 4.3. The mode of vibrating 450 comprises a primary mode of vibration 452 and a Coriolis induced mode of vibration 454, with the primary and Coriolis-induced modes being conceptualized in the bottom half 460 of the figure at 452' and 454' and with corresponding Coriolis forces being represented at 453 and 455.

As shown, the magnetic shield 411 and protective material 414 are disposed about an outer surface of the gyroscope body 402, but optionally may be positioned about other locations along the gyroscope for providing shielding, such as along an inner surface of the gyroscope body. The protective material 414 may be along various surfaces to prevent wear between moving components in and/or about the gyroscope.

The setup shown in FIG. 5.1 relates to a gyroscope body 502 being provided either (i) as shown in FIGS. 2 and 3 or (ii) with windows 505 provided therein. The setup is shown as a plan (top) view, with components arranged in positions for the initial measurement. The device under test (DUT) is horizontally mounted on the rotary stage, cf. NEWPORT CO. LTD.™, for provision of flip and rotation sequence, leading to an output-bias cancelation and extraction of the Earth angular rate.

Inductive coils, i.e., Helmholtz coils 525 are provided on opposing sides of the gyroscope body 502 for providing a magnetic field 526 in the setup, with the flip and rotation direction being indicated by arrow Al, the input axis being shown at 515, and North being indicated by the common notation, N, in the drawing. The static external magnetic field, e.g., up to about 25 Gauss is generated by the Helmholtz coils 525 as unwanted artificial magnetic interference. Moreover, in addition to (i) and (ii), a third parameter (iii) may be varied between the gyroscope body 502 comprising a material of high-magnetic permeability, i.e., permalloy, or, as a control, a material that is not of high-magnetic permeability.

On the nature of arrow A1, to extract the absolute angular velocity derived from Earth-rotation, output bias-offset can be canceled out by physically flipping 180 degrees of the input axis, e.g. whereby polarity of the signal is changed by the gyroscope flipping while the bias stays constant. FIG. 5.2 and the following FIGS. 6.1-6.7 disclose in-situ calibration (bias cancellation) set up information and determination protocols in connection with the above-noted (i)-(iii) considerations. For instance, in the context of North seeking for the setup/experiments in regard to (i)-(iii) and flipping the inductive-type MEMS gyroscope at stationary condition, relevant relationships are presented below correspondingly in connection with, for example, the schematic of FIG. 5.2, generally, such being:

$$\Omega(0°)\_1 = \Omega_E + \Omega_{bias(1)} \qquad \text{Eqn. (1)}$$

$$\Omega(180°)\_2 = -\Omega_E + \Omega_{bias(2)} \qquad \text{Eqn. (2)}$$

$$\Omega(0°)\_3 = \Omega_E + \Omega_{bias(3)} \qquad \text{Eqn. (3)}$$

$$\Omega(0°)\_2 = \frac{\Omega(0°)\_1 + \Omega(0°)\_3}{2} \Omega_E + \Omega_{bias(2)} \qquad \text{Eqn. (4)}$$

$$\Omega_E = \frac{\Omega(0°)_2 - \Omega(180°)\_2}{2} \qquad \text{Eqn. (5)}$$

Where $\Omega_E$ is Earth rate component, $\Omega_{bias}$ is gyroscope bias-offset, and $\Omega$ (0, 180°)_1, 2, 3 are the first gyroscope measurement output at the first position, the gyroscope measurement output at the second position, which is the 180 degrees flipped from the first position and the second gyroscope measurement output at the first position after taking the measurement at the second position, respectively.

Furthermore, FIGS. 6.1-6.7 are plots in regard to the (i)-(iii) experimental data collected according to this description, such corresponding in particular to the criteria of FIGS. 5.1 and 5.2. Delving now into data of the setup and that which was collected, the graph of FIG. 6.1 comprises an x-axis of time after power up in minutes, and a y-axis of bias offset in degrees per hour. Eleven plots 461 are shown, corresponding to parameters of −10° C.(2), −20° C., −10° C., 0° C., 10° C., 20° C., 30° C., 40° C., 50° C., 60° C. and 50° C. FIG. 6.2 portrays gyroscope raw data for the indicated items with an x-axis of time in seconds, and a y-axis of gyroscope output in volts (V), with the Earth-rate component shown at 463. FIG. 6.3 shows gyroscope Earth-rotation detection (180 degree flip) using an x-axis of gyroscope-angle position in degrees and a y-axis of the Earth-rotation component in degrees per hour.

In FIG. 6.4 the x-axis is used to show the gyroscope-angle position in degrees and the y-axis is used for the Earth-angular rate in degrees per hour. Here, reference data for the group of plots of the Earth-rate components is obtained from a gyroscope formed as above with, particularly, a gyroscope body of a control material (per (iii)) of Titanium for the condition of being under non-magnetic disturbance, i.e., zero Gauss, and using the bias cancellation method. By changing the original angle position of the input axis, the projection of Earth-rate to the input axis is changed with the group of plots resulting in a sinusoidal-like curve. The positive peak of the sinusoidal-like curve, in this case, indicates the direction of North in a plane normal to the input axis. The positive and negative peak amplitude correspond to the Earth angular-rate on the horizontal configuration, i.e., input axis is rotated around the plane normal to the gravity vector, which is equivalent to the Earth-rate of +/−12.26 degrees per hour at the latitude of 35.40 degrees, corresponding to Tokyo.

FIG. 6.6 shows the difference between measured Earth angular-rate ($\Omega$M) and theoretical value ($\Omega$T), cf. y-axis, at each angular position, cf. x-axis, under six different external magnetic fields, namely, zero Gauss, 5 Gauss, 10 Gauss, 15 Gauss, 20 Gauss and 25 Gauss. These data are obtained from the Titanium gyroscope body. The straight, horizontal plot corresponds to the reference data obtained under non-magnetic interference environment, e.g., data from FIG. 6.4, which is in agreement with the theoretical Earth-rate, while the deviation from theoretical value is directly related to the magnetic sensitivity on the sensor output. It can be noted that the deviation from the theoretical value systematically increases with increasing the external magnetic field, which seems to be linear trend of the influence against the external magnetic field. Note also that the magnetic sensitivity becomes more prominent at the angle position with the high amplitude of Earth-rate. The maximum magnetic sensitivity on the gyroscope can be estimated to be 0.7 degree/hour/Gauss in this example. Thus, it can be concluded that the current gyroscope possesses a non-negligible magnetic sensitivity for the oilfield application.

Experimental data corresponding to that of FIGS. 6.4 and 6.6, but with the gyroscope body comprising permalloy instead of Titanium, are shown in FIGS. 6.5 and 6.7. Ergo, with regard to the last-mentioned figures, the same experiments that were conducted with a Titanium gyroscope body were conducted with a permalloy gyroscope body thus yielding a plot of the difference between measured and theoretical gyroscope output (for a permalloy gyroscope body without the window) and a plot of the difference between measured and theoretical gyroscope output (for a permalloy gyroscope body with the window). In order to elucidate an effectiveness of the permalloy based magnetic shield on the inductive-type MEMS gyroscope performance, the permalloy gyroscope body with a small window (per (ii)) operated as or to simulate an arbitrary defect on the magnetic shield. The differences between measured and theoretical gyroscope output displayed in FIGS. 6.5 and 6.7 are under the several external magnetic fields.

The external magnetic field does not appear to influence sensor output in the case of the permalloy gyroscope body, noting the variation of residual error appearing to be explainable via considerations of the intrinsic sensor noise and also the absence of systematic trends. Meanwhile, as can be discerned from FIG. 6.7, the presence of a small defect on the permalloy gyroscope body (small window) clearly indicates the existence of unwanted magnetic sensitivity. As expected, the deviation amplitude is to a sizable extent suppressed as compared to the case for a titanium gyroscope body. These experimental results show that the gyroscope body when utilized can play a positive role of effective magnetic shielding on the inductive-type MEMS gyroscope output. It is discerned from the data that the inductive-type MEMS gyroscope may, optimally, be as fully covered by permalloy material as possible, since any small defect (in this case, the small window) according to the data can give rise to a non-negligible error on the inductive-type MEMS gyroscope output.

Figure 7:
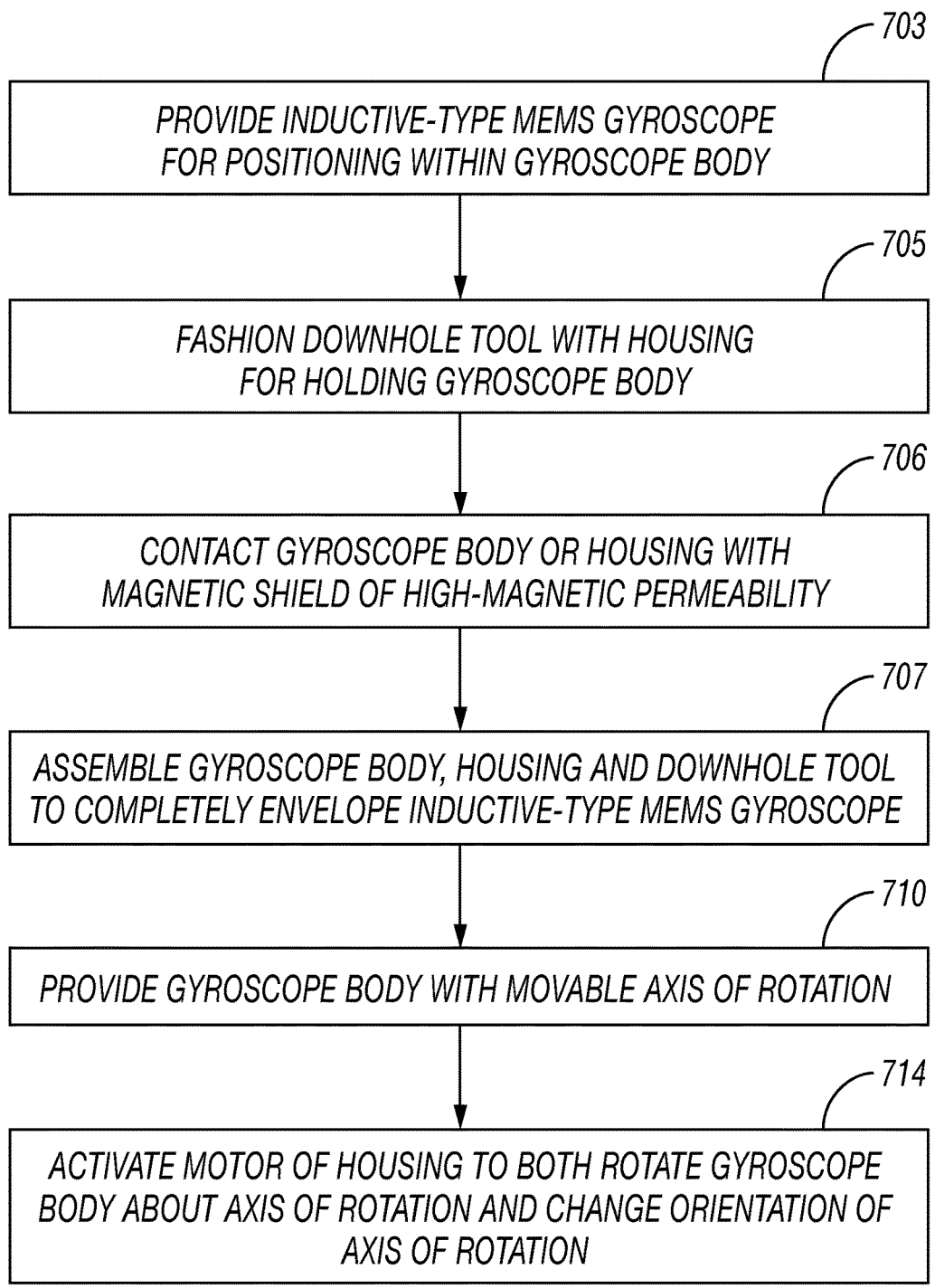
FIG. 7 is a flow chart depicting a method for measuring angular displacement of a downhole tool in accordance with an embodiment of the disclosure.

With reference to the flow chart shown in FIG. 7, a method for implementing principles of this description can comprise, for instance, providing 703 an inductive-type MEMS gyroscope such as discussed above for positioning within a gyroscope body, followed by fashioning 705 a downhole tool with the housing for holding the gyroscope body. At 706 one or more of the gyroscope body and the housing are contacted with a magnetic shield of high-magnetic permeability, with ensuing 707, not necessarily in sequence, of assembling the gyroscope body, the housing and the downhole tool to completely envelope the inductive-type MEMS gyroscope with the magnetic shield. The gyroscope body is provided 710 with a movable axis of rotation, e.g., a movable body axis. At 714, a motor of the housing is activated both to rotate the gyroscope body about the axis of rotation and to change an orientation of the axis of rotation.

The inductive-type MEMS gyroscope can be provided with its input axis non-parallel to, and about fixed with respect to, the body axis. Further, the magnetic shield can be enabled with a magnetic permeability at least an order of magnitude greater than that of steel.

According to the method, the downhole tool is deployed into the wellbore, the downhole tool optionally having an accelerometer coupled to a microcontroller, and the inductive-type MEMS gyroscope being coupled to the microcontroller and encompassed about entirely by the magnetic shield.

The method further can comprise providing a protective material in contact with the magnetic shield, the protective material having a hardness greater than a hardness of steel. When the downhole tool is coupled to have or communicate with a downhole telemetry module, the method can comprise both using the downhole telemetry module to establish communication with a surface telemetry module and conveying angular displacement information in relation to the downhole tool to the surface telemetry module.

Although a few embodiments have been described in detail above, those skilled in the art will readily appreciate that other embodiments and many modifications in the embodiments are possible without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A magnetically shielded inductive-type MEMS gyroscope package for use in a downhole tool suitable for operation within a wellbore penetrating a subterranean formation, comprising:
   a housing coupleable with the downhole tool;
   a motor within the housing;
   a gyroscope body rotatably provided within the housing and coupled to the motor, wherein the gyroscope body comprises an axle that comprises a rotation axis and a hollow body coupled to the axle wherein the axle passes through hollow body axle openings of the hollow body, wherein:
   the gyroscope body contains a single gyroscope therein;
   the single gyroscope in the gyroscope body is an inductive-type MEMS gyroscope that comprises a casing and an input axis orthogonal to the rotation axis, wherein the inductive-type MEMS gyroscope and casing are mounted to the axle within the hollow body; and
   the rotation axis of the gyroscope body is selectively rotatable by the motor in each of x, y, and z directions, such rotation rotating the gyroscope body and thereby changing an orientation of the input axis of the single gyroscope;
   a magnetic shield covering a surface of the hollow body around all regions of the inductive-type MEMS gyroscope to magnetically shield the inductive-type MEMS gyroscope; and
   a protective material disposed on, covering and mechanically protecting the surface of the magnetic shield.

2. The magnetically shielded inductive-type MEMS gyroscope package as set forth in claim 1, wherein the protective material is provided over a hollow body interior surface and a hollow body exterior surface.

3. The magnetically shielded inductive-type MEMS gyroscope package as set forth in claim 1, wherein the inductive-type MEMS gyroscope comprises a vibrating ring.

4. The magnetically shielded inductive-type MEMS gyroscope package as set forth in claim 1, wherein the magnetic shield comprising one or more of permalloy, supermalloy, PC-permalloy, permendur, or µ-metal.

5. The magnetically shielded inductive-type MEMS gyroscope package as set forth in claim 1, wherein the magnetic shield covers an entirety of the surface of the hollow body.

6. The magnetically shielded inductive-type MEMS gyroscope package as set forth in claim 1, wherein the magnetic shield is integrally formed with the hollow body.

7. The magnetically shielded inductive-type MEMS gyroscope package as set forth in claim 1, wherein the protective surface has a hardness greater than that of steel.

8. The magnetically shielded inductive-type MEMS gyroscope package as set forth in claim 1, wherein the magnetic shield has a magnetic permeability that is at least 10 times greater than that of steel.

9. The magnetically shielded inductive-type MEMS gyroscope package as set forth in claim 1, wherein the magnetic shield has a relative permeability of at least 100.

10. The magnetically shielded inductive-type MEMS gyroscope package as set forth in claim 1, further comprising a casing magnetic shield formed as a layer over the casing.

11. The magnetically shielded inductive-type MEMS gyroscope package as set forth in claim 1, wherein a thickness of the magnetic shield is greater than 100 micrometers.

12. The magnetically shielded inductive-type MEMS gyroscope package as set forth in claim 1, wherein the magnetic shield completely envelopes the inductive-type MEMS gyroscope package.

13. The magnetically shielded inductive-type MEMS gyroscope package as set forth in claim 1, wherein the single inductive-type MEMS gyroscope is rotatable in six directions inside the housing.

14. A system for providing angular measurement in subterranean oil well drilling and logging environments, comprising:
- a downhole tool positionable within a wellbore penetrating a subterranean formation, the downhole tool comprising a housing;
- a motor within the housing;
- a gyroscope body rotatably provided within the housing and coupled to the motor, wherein the gyroscope body comprises an axle that comprises a rotation axis and a hollow body coupled to the axle wherein the axle passes through hollow body axle openings of the hollow body, and wherein:
    - the gyroscope body contains a single gyroscope therein;
    - the single gyroscope in the gyroscope body is an inductive-type MEMS gyroscope that comprises a casing and an input axis orthogonal to the rotation axis, wherein the inductive-type MEMS gyroscope and casing are mounted to the axle within the hollow body; and
    - the rotation axis of the single gyroscope is selectively rotatable by the motor in each of x, y, and z directions, such rotation rotating the gyroscope body and thereby changing an orientation of the input axis of the single gyroscope;
- a magnetic shield integrally formed with the hollow body to completely envelope the inductive-type MEMS gyroscope with the magnetic shield and magnetically shield the inductive-type MEMS gyroscope; and
- a protective material disposed on, covering and mechanically protecting the surface of the magnetic shield.

15. The system as set forth in claim 14, wherein the gyroscope body is configured to be flipped within the housing to selectively rotate the rotation axis and change the orientation of the input axis of the single.

16. The system as set forth in claim 14, wherein the magnetic shield comprising one or more of permalloy, supermalloy, PC-permalloy, permendur, or µ-metal.

17. The system as set forth in claim 14, wherein the magnetic shield is provided over a hollow body interior surface or a hollow body exterior surface.

18. A method of monitoring angular measurement of a downhole tool, the method comprising:
- securing a single inductive-type MEMS gyroscope within a gyroscope body, wherein the gyroscope body comprises an axle that comprises a rotation axis and a hollow body coupled to the axle wherein the axle passes through hollow body axle openings of the hollow body, the rotation axis being movable relative in x, y, and z directions and the hollow body having a hollow body inner surface and a hollow body outer surface and wherein the single inductive-type MEMS gyroscope comprises a casing and an input axis orthogonal to the rotation axis, wherein the inductive-type MEMS gyroscope and casing are mounted to the axle within the hollow body;
- providing a downhole tool, the downhole tool having a housing with a housing outer surface and a housing inner surface, and being constructed to hold the gyroscope body therein;
- positioning a magnetic shield on one or more of the hollow body inner surface or the hollow body outer surface, wherein positioning the magnetic shield includes completely enveloping the inductive-type MEMS gyroscope in the magnetic shield;
- providing a protective material in the form of a layer or a film on the magnetic shield for mechanically protecting at least part of the magnetic shield; and
- activating a motor within the housing both to selectively change an orientation of the rotation axis in any of the x, y, and z directions and to rotate the gyroscope body about the rotation axis, and thereby change an orientation of the rotation axis and the input axis within the downhole tool.

19. The method set forth in claim 18, wherein the inductive-type MEMS gyroscope comprises a vibrating ring.

20. The method as set forth in claim 18, wherein the magnetic shield comprising one or more of permalloy, supermalloy, PC-permalloy, permendur, or µ-metal.

* * * * *